US012699995B1

(12) United States Patent
Kom et al.

(10) Patent No.: US 12,699,995 B1
(45) Date of Patent: Aug. 4, 2026

(54) MULTI-ORACLE

(71) Applicant: Core Scientific Operating Company, Bellevue, WA (US)

(72) Inventors: Lawrence Kom, Redmond, WA (US); Thomas Middleton Rutledge Fuller, Seattle, WA (US)

(73) Assignee: Core Scientific, Inc., Austin, TX (US)

( * ) Notice: Subject to any disclaimer, the term of this patent is extended or adjusted under 35 U.S.C. 154(b) by 0 days.

(21) Appl. No.: 17/744,915

(22) Filed: May 16, 2022

Related U.S. Application Data

(60) Provisional application No. 63/188,629, filed on May 14, 2021.

(51) Int. Cl.
| | |
|---|---|
| *G06Q 20/38* | (2012.01) |
| *G06Q 30/0283* | (2023.01) |
| *H04L 9/00* | (2022.01) |

(52) U.S. Cl.
CPC ....... *G06Q 20/389* (2013.01); *G06Q 30/0283* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 10,536,537 | B1* | 1/2020 | Le | G06Q 20/386 |
| 10,943,680 | B1* | 3/2021 | Knas | H04L 9/0861 |
| 11,862,304 | B1* | 1/2024 | Klein | G16H 40/67 |
| 2017/0287068 | A1* | 10/2017 | Nugent | G06Q 20/08 |
| 2018/0331835 | A1* | 11/2018 | Jackson | H04L 9/3297 |
| 2019/0129895 | A1* | 5/2019 | Middleton | H04L 9/0637 |
| 2019/0378069 | A1* | 12/2019 | Deshpande | G06Q 10/06315 |
| 2020/0160320 | A1* | 5/2020 | Williams | G06Q 20/40 |
| 2020/0211024 | A1* | 7/2020 | Li | G06Q 20/389 |
| 2021/0209091 | A1* | 7/2021 | Jing | H04L 9/3247 |
| 2022/0058646 | A1* | 2/2022 | Oh | G06Q 20/401 |

OTHER PUBLICATIONS

Zheng, Qiuhong, et al. "An innovative IPFS-based storage model for blockchain." 2018 IEEE/WIC/ACM international conference on web intelligence (WI). IEEE, (Year: 2018).*

Pasdar A, Dong Z, Lee YC. Blockchain oracle design patterns. arXiv preprint arXiv:2106.09349. Jun. 17, 2021 (Pasdar) (Year: 2021).*

* cited by examiner

*Primary Examiner* — Ryan D Donlon
*Assistant Examiner* — Brock E Turk
(74) *Attorney, Agent, or Firm* — Fishman Stewart PLLC

(57) ABSTRACT

Systems and methods for storing multiple data elements to a blockchain are disclosed. Data source descriptors along with options such as data update frequency and data update conditions are received by a multi-oracle service. The multi-oracle service gathers data elements from multiple external sources and based on the options packs them together into transactions for recording on a blockchain network. The multi-oracle service may eliminate the need for individual users to create their own oracles and reduce costs by packing multiple data elements together in transactions at different update frequencies and with different update conditions to efficiently support multiple users or clients with a single transaction.

19 Claims, 4 Drawing Sheets

MULTI-ORACLE

CROSS-REFERENCE TO RELATED APPLICATION

This application claims the benefit of and priority to U.S. Provisional Patent Application Ser. No. 63/188,629, filed on May 14, 2021, the disclosure of which is hereby incorporated by reference in its entirety as though fully set forth herein

TECHNICAL FIELD

The present disclosure generally relates to blockchain networks, specifically oracles for communicating information to blockchain networks.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

A blockchain is a system of recording information in an immutable way (i.e., making it difficult or impossible to change or rewrite). A blockchain is a digital ledger of transactions that is duplicated and distributed across the entire network of computer systems on the blockchain. Many blockchains can be used not only to transfer funds (e.g., cryptocurrencies) from one account to other accounts, but also to perform conditional transactions (i.e., smart contracts). By design, smart contracts are typically limited to only accessing data that is on the blockchain and not capable of accessing data that is off the blockchain.

One way around this problem is to use an oracle, which is a service that provides external information to smart contracts. Oracles can act as a "bridge" to connect data sources to the blockchain. For example, a weather-based insurance smart contract may be configured to pay a farmer for lost crops if there is a frost in a certain county before a certain harvest date. In order for the smart contract to know whether a frost has occurred, an oracle can be used to send that data regarding frost to the blockchain so that the smart contract can execute on that data.

Smart contracts have the potential to be an efficient mechanism for performing many different types of transactions without requiring direct human interaction. However, one drawback to smart contracts is the difficulty and cost associated with setting up an oracle. Setting up an oracle typically requires a certain level of expertise, as the oracle program must be written, tested, and deployed (e.g., on a server, in a container, or using server-less lambda functions). In the previous example, the oracle would be a program that monitors a trusted weather data source (e.g., daily for a predetermined number of months) and then writes the frost data to the blockchain if and when it occurs to trigger payment under the smart contract. Writing these oracle programs can be difficult for average consumers and businesspeople.

Another problem is the cost associated with setting up and running an oracle. There are cloud hosting fees for the server, container, or lambda function, and there are costs associated with writing/storing data to the blockchain itself. As more and more users conduct transactions and write data to the blockchain, transaction costs (e.g., gas fees) have climbed dramatically.

For at least these reasons, there is a desire for an improved system and method for storing data to a blockchain. The foregoing discussion is intended only to illustrate examples of the present field and is not a disavowal of scope.

SUMMARY

A multi-oracle system and method are contemplated for efficiently storing multiple data elements to a blockchain in individual transactions. The multi-oracle may eliminate the need for individual users to create their own oracles and reduce costs by packing multiple data elements together in a single transaction supporting multiple clients. Instead of having ten users create ten different oracles that each create multiple transactions to periodically store data to a blockchain, the multi-oracle service may be accessed by users (e.g., via a web interface or API or contract) to specify what data is desired to be stored to the blockchain and at what frequency. The multi-oracle service may collect the different data elements requested by the ten different users and write them to the blockchain periodically (e.g., once per hour or once per day) in a single transaction. Reducing the number of transactions may reduce overall costs incurred by users. The multi-oracle may also be configured to pack the different individual data elements together to reduce the overall length (e.g., number of bytes) of the transaction to further reduce costs.

The users may specify data source descriptors such as what data and data source (e.g., low temperature for a particular county as recorded by a particular weather data provider) along with options such as data update frequency (e.g., hourly, daily, weekly, monthly) and data update conditions (e.g., store to blockchain only if the temperature is below the seasonal average low by more than 10%) are received by a multi-oracle service. The multi-oracle service gathers data elements (also called data values) from multiple external sources (e.g., weather data providers, stock data providers, commodities price providers), and based on the options packs them together into transactions for recording on a blockchain network.

In embodiments, the method may comprise receiving a data source descriptor from a first user, gathering a first data value using the first data source descriptor, receiving a second data source descriptor from a second user, gathering a second data value using the second data source descriptor, packing the first data value and the second data value in a transaction, and submitting the transaction to a blockchain network for inclusion in a blockchain. In some embodiments, packing may for example comprise bit shifting the first data value and the second data values to increase or maximize the number of zeros (or leading zeros) in the transaction. The gathering and or submitting may be performed according to an update frequency specified by the users for the data sources (e.g., different data sources may have different specified update frequencies). So, a particular data source may for example only be included in the multi-oracle's transactions once per day even though the multi-oracle may submit transactions to the blockchain every hour. The multi-oracle may also for example include certain data elements/values if a first condition has been met and not included it if the first condition has not been met. In another example, a data value may be included in the transaction if one or more of the following conditions are met: (i) a predetermined time period has expired, or (ii) a first data value has changed by at least a predetermined minimum update threshold value.

A cost may be calculated or estimated and charged for each data recordation request based on size, frequency, etc. For example, the size of the first data value may be estimated, and a first cost for recording the data may be calculated or estimated based on the size, the update frequency, and a current transaction cost (e.g., per byte cost for storing data) for the blockchain network.

The multi-oracle may handle paying the overall transaction fee for the transaction (e.g., adjusting the fee to ensure a predetermined transaction recordation frequency or based on a percentage of the sum of the calculated or estimated data recordation costs).

The method may for example be implemented as a non-transitory, computer-readable storage medium storing instructions executable by a processor of a computational device such as a PC or server.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
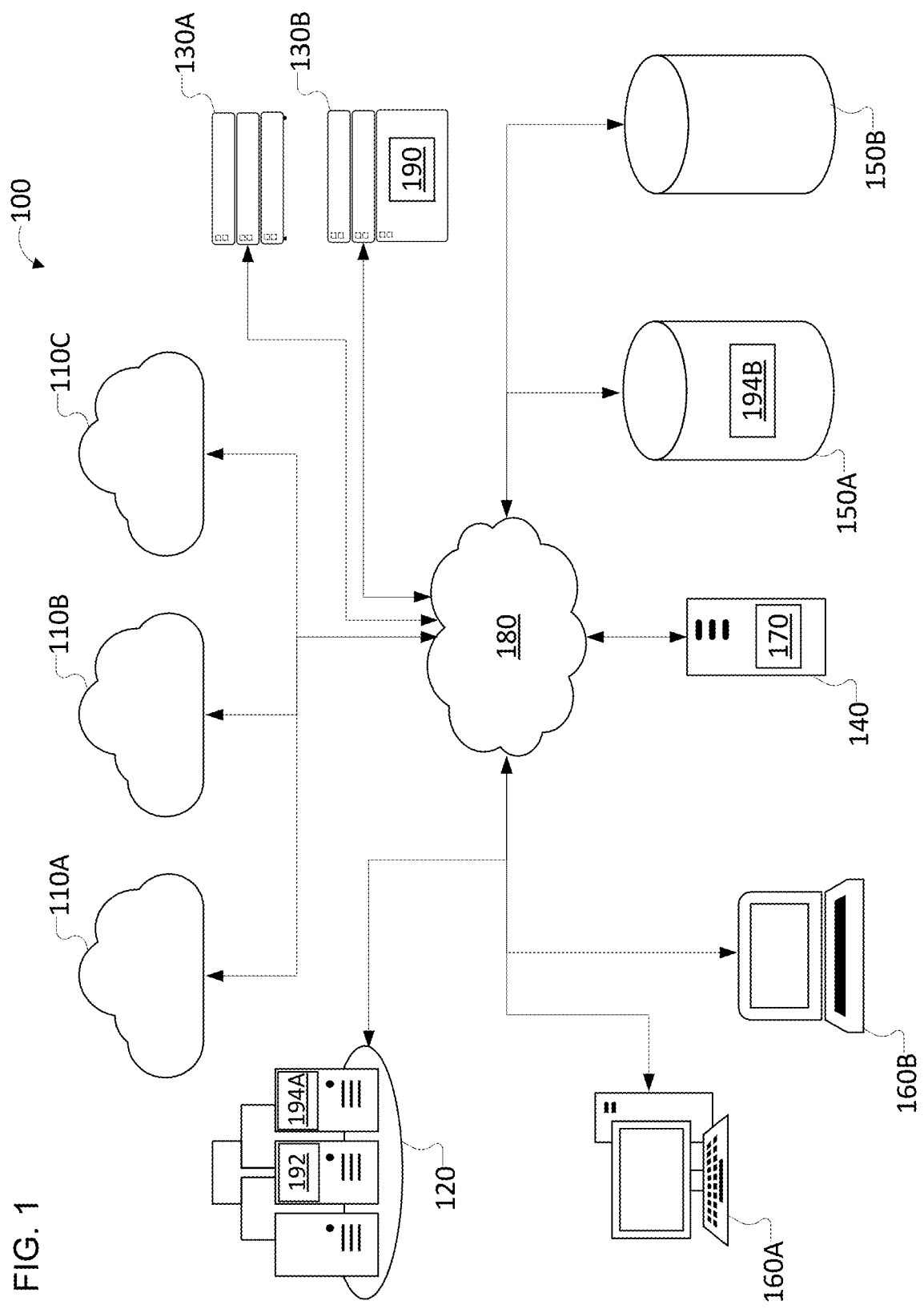
FIG. 1 is a schematic diagram generally illustrating an example of a system for storing data to a blockchain according to teachings of the present disclosure.

Turning now to FIG. 1, a schematic view generally illustrating an example of a system 100 for storing data to a blockchain according to teachings of the present disclosure is shown. In embodiments, system 100 comprises a number of computing devices or providers connected via a network 180 (e.g., the internet). The computing devices may include for example cloud computing providers 110A, 110B and 110C, a computing cluster 120, network-attached storage devices 150A and 150B, computing device 140 (e.g., a traditional PC or server), and specialized computing devices 130A-130B. For example, cloud computing providers 110A-C may be public cloud providers or private cloud providers, and specialized computing devices 130A and 130B may be CPU-based, GPU-based, FPGA-based, or ASIC-based computing devices configured to execute a mining program 190 or firmware that enables them to participate in a blockchain network (e.g., as Bitcoin cryptocurrency miners or Ethereum miners). The blockchain network may be operated by many different computing devices each executing a blockchain node program 192. Copies of the blockchain itself 194A and 194B may for example be stored locally in cluster 120 or on network-attached storage devices 150A-150B.

Similarly, compute device 140 may be configured to execute a multi-oracle program 170, that enables users to easily store data to the blockchain network. Users may access the multi-oracle program 170 from their local computing devices such as PC or server 160A or mobile device such as a mobile phone or a laptop 160B. In other embodiments, multi-oracle program 170 may be executed on a cloud computing system such as those provided by cloud computing providers 110A-C. The multi-oracle program 170 may be configured to receive requests, e.g., from users via a web interface or web application programming interface (API) to store information to the blockchain, and it may prompt the user to specify a data source (e.g., a web site or web service accessible via network 180), the specific data to be stored (e.g., the daily low temperature in a particular city), the update frequency (e.g., once per day, once per week), and update conditions (e.g., only store if the temperature is more than 10% below average low temperature).

Based on this information, the multi-oracle program 170 may confirm that it can access the specified data source, measure the size of the data (e.g., number of bytes) and then calculate or estimate a cost based on the update frequency and or update conditions specified. The user may for example be prompted for payment information (e.g., a request to deposit enough payments for a month's worth of updates). Once payment information is received, the multi-oracle program 170 may be configured to add an entry into a job queue representing the information to be stored to the blockchain, the data source, the update frequency, and associated update conditions. The associated user's information (e.g., username, payment account) may be stored as well. The multi-oracle program 170 may then periodically gather data for all entries in the queue, filter the data to ensure that only necessary data is being stored and then package the data (e.g., to combine multiple different data elements together (e.g., data requested by different users) before submitting it as a transaction to the blockchain. Packaging may for example include bit shifting to permit more data elements to be stored in a single transaction with a lower overall byte count, as longer transactions may cost more to store on the blockchain.

Figure 2:
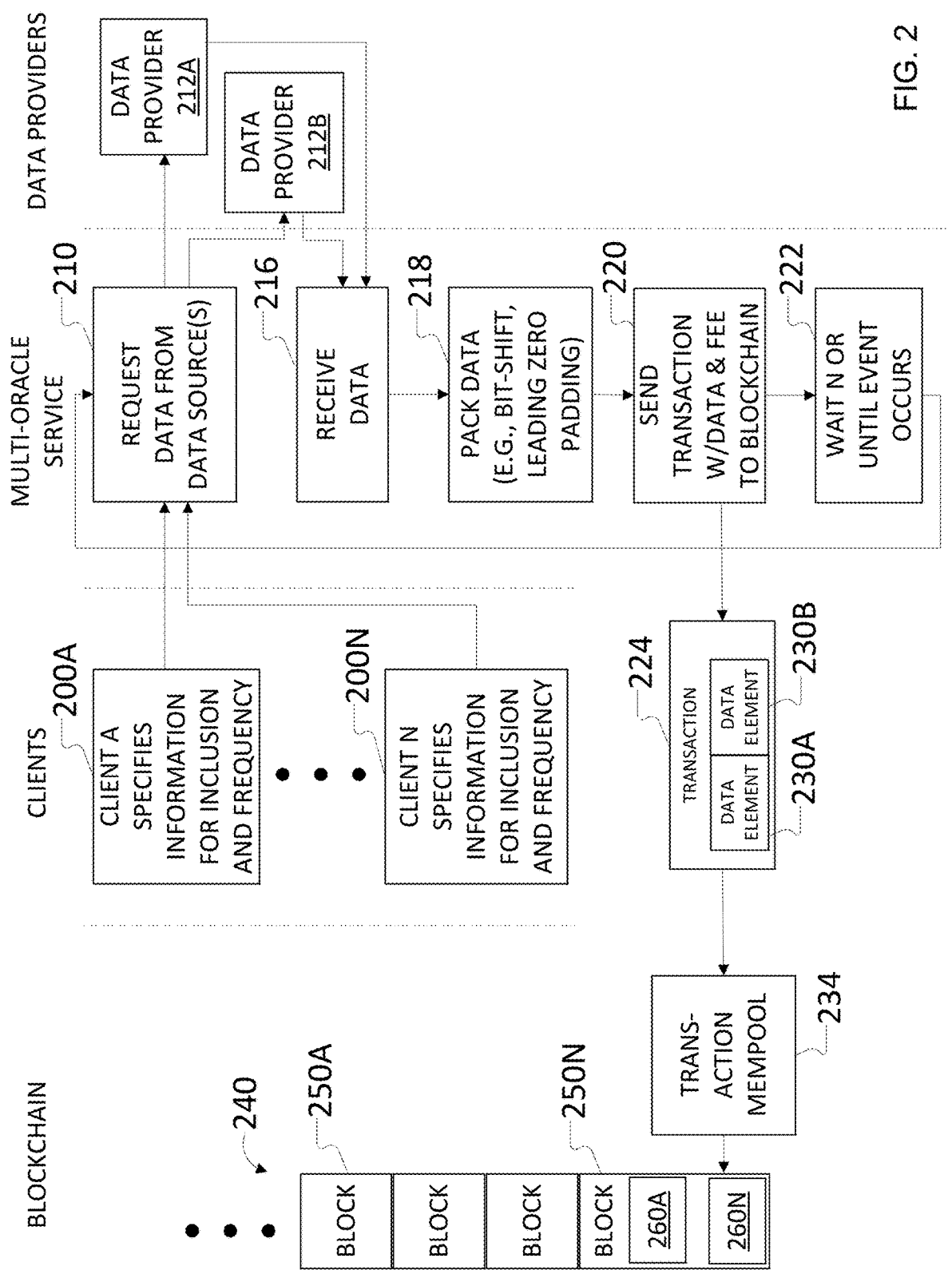
FIG. 2 is a flow diagram generally illustrating an example of a method for storing data to a blockchain according to teachings of the present disclosure.

Turning now to FIG. 2, a flow diagram generally illustrating an example of a method for storing data to a blockchain according to teachings of the present disclosure is shown. In embodiments, users access the multi-oracle service (steps 200A-N), e.g., via web browsers or client apps. The multi-oracle service may interactively request the user to specify the data for inclusion, the frequency for inclusion, any triggering conditions, etc. The multi-oracle service may be configured to request the data from data providers (step 210), and in response the data providers may provide the requested information to the multi-oracle service (steps 212A and 212B). The multi-oracle service may receive the data (step 216) from the data providers and then pack the data elements into a transaction (step 218) that is sent to the blockchain (step 220), e.g., with the corresponding fee. Packing may for example involve compressing, bit-shifting (e.g., with a bit shifter), encoding, and or padding (e.g., with zeros). In embodiments, the different data requests may be updated on different frequencies, so not all data elements may be included in every transaction sent by the multi-oracle service. The multi-oracle service may wait until a particular delay (e.g., one day) or event (e.g., a certain stock price has been reached) before including a particular data element in the multi-oracle's next transaction (step 222). For example, one example transaction 224 may comprise daily updated data element 230A (e.g., daily close price of a stock or commodity) and conditional data element 230B (e.g., daily low temperature for a particular city that is only included in the transaction if it is more than 10% below the average daily low for that day).

Depending on the blockchain, the transaction may for example enter the blockchain's memory pool of transactions ("mempool") and wait until it is incorporated (step 234) as one of the transactions 260A-N in one of the blocks 250A-N of the blockchain 240.

The multi-oracle service may also perform other functions. For example, in some embodiments, the multi-oracle service may communicate to the client how the requested data will be encoded (e.g., the offset within the transaction data field where the data will be located). It may also generate estimates of the cost for including data of a particular size and update frequency (e.g., by monitoring current and historical transaction costs per byte such as 0.0001 BTC per byte). It may also offer lower pricing for "as available" inclusion in transactions (e.g., on a space available basis). The multi-oracle service may also be accessible via API (application programming interface) in addition to, or in lieu of, a web interface.

Figure 3:
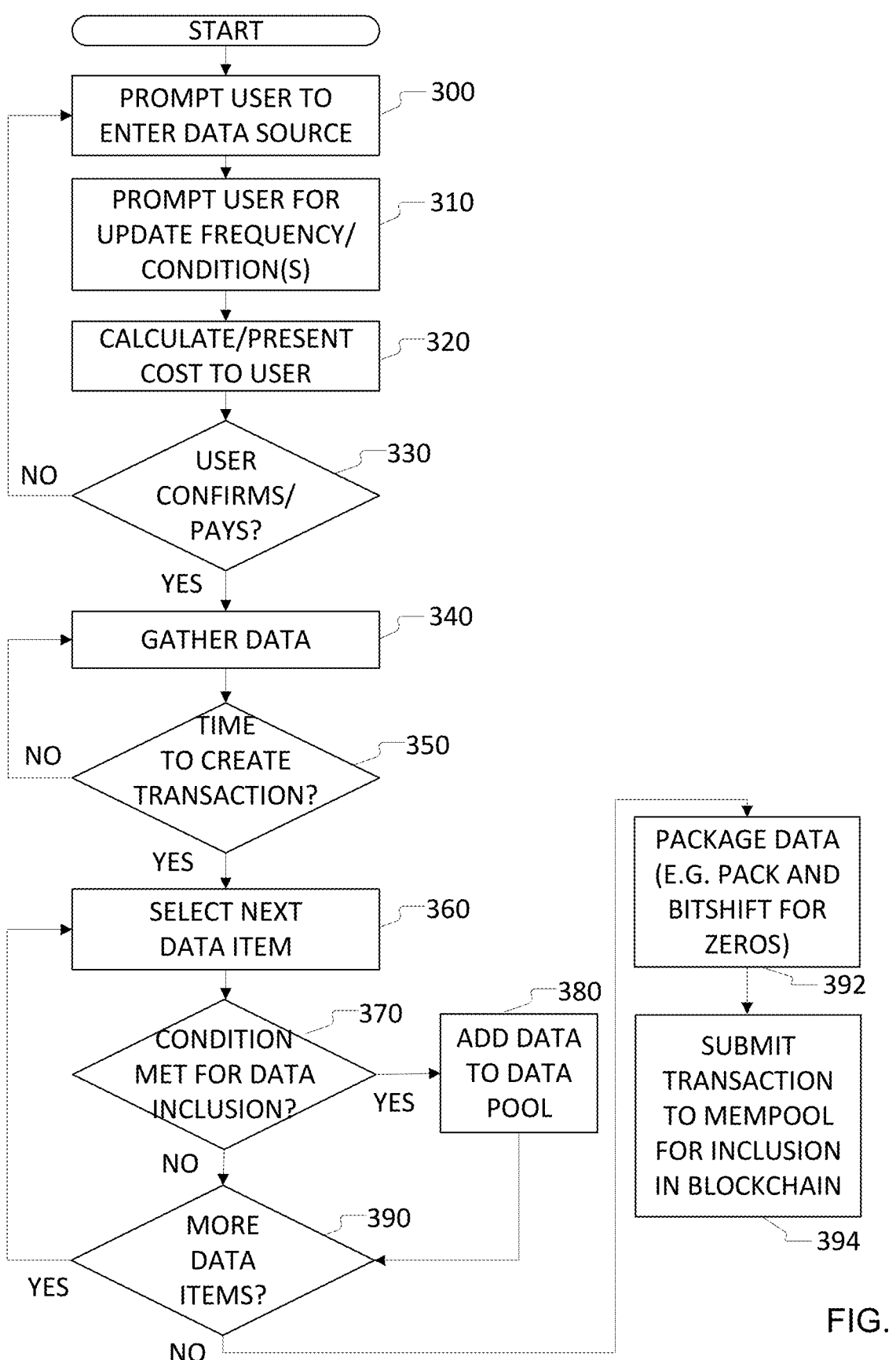
FIG. 3 is another flow diagram generally illustrating an example of a method for storing data to a blockchain according to teachings of the present disclosure.

Turning now to FIG. 3, another flow diagram view generally illustrating an example of a method for storing data to a blockchain according to teachings of the present disclosure is shown. In this embodiment, a user is prompted to specify a data source (step 300) and update frequency or conditions (step 310). These are used to calculate and present a price or cost estimate to the user (step 320). If the user confirms and or pays the price or estimated cost (step 330), the multi-oracle service may proceed to gather the requested data from the specified data source (step 340). Once the time/frequency condition (if any) is met (step 350) for each data element (step 360), the data elements (also called data items) are checked to see if any other condition specified are met (step 370). Each data element that has its conditions met is added to a data pool or queue for inclusion in the next transaction (step 380). The conditions are checked for each data element (step 390), and then the data elements for inclusion are packaged (step 392) into a transaction that is submitted to the blockchain (step 394).

Figure 4:
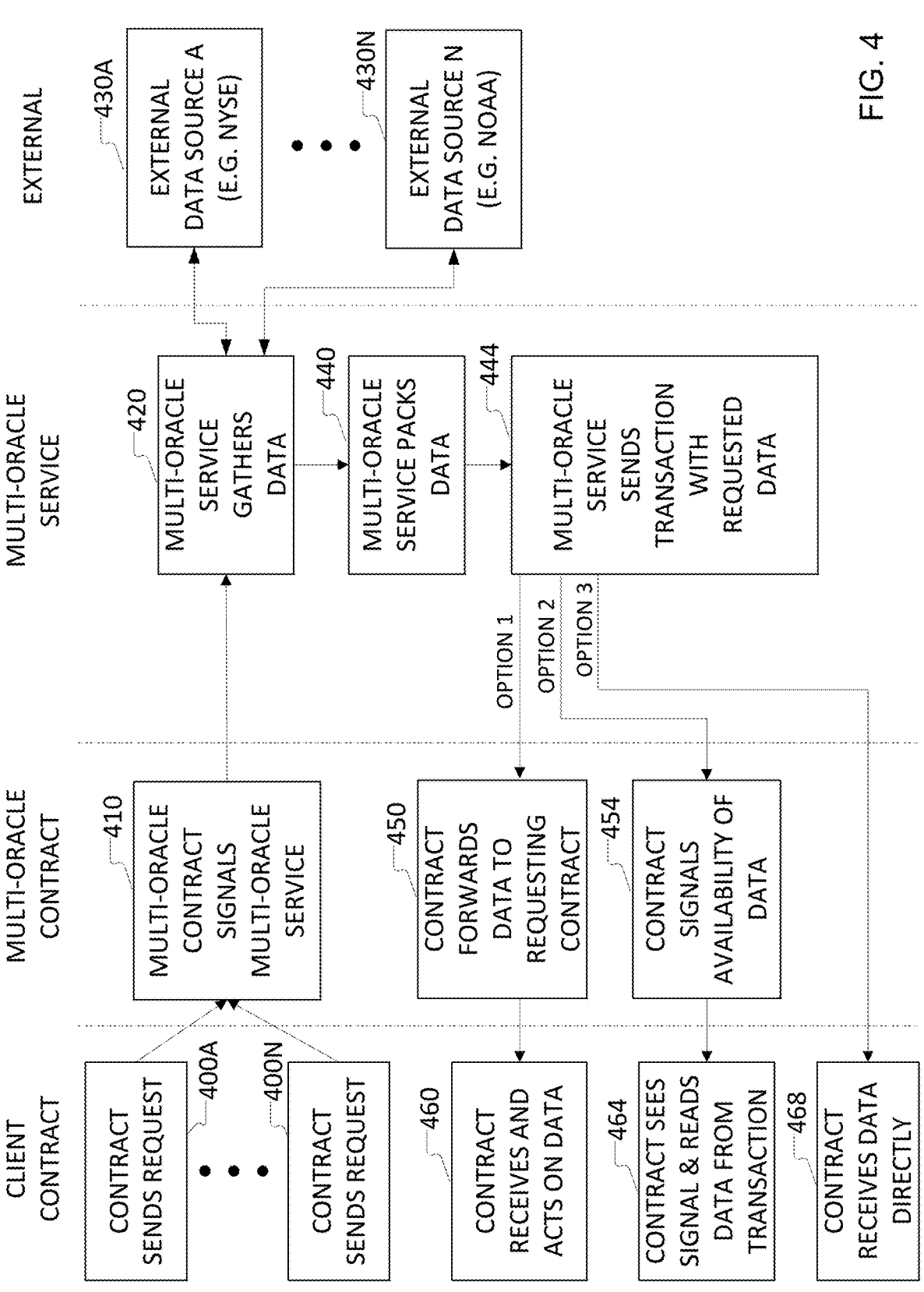
FIG. 4 is yet another data flow diagram generally illustrating an example of a method for storing data to a blockchain according to teachings of the present disclosure.

Turning now to FIG. 4, a data flow diagram generally illustrating another example of a method for storing data to a blockchain according to teachings of the present disclosure is shown. In this embodiment, one or more client contracts are used to send requests to the multi-oracle service via a multi-oracle contract (step 400A-400N). In response, the multi-oracle contract may signal the multi-oracle service (step 410). The multi-oracle service may gather the requested data (step 420) from one or more external data sources (steps 430A-N) such as a stock exchange data service (e.g., NYSE, NASDAQ) or a weather service (e.g., NOAA). Based on the update frequencies and or update conditions specified in the client contracts, the gathered data may be packed into one or more transactions (step 440) and transmitted (step 444). In some embodiments, the multi-oracle contract may forward the data to the requesting client contract (step 450), and the client contract may receive and act on that data (step 460), e.g., trigger execution of a smart contract. In other embodiments, the multi-oracle contract may signal the availability of data to the client contract (step 454). The client contract may receive the signal and then read the data in the transaction stored on the blockchain (step 464). In yet other embodiments, the multi-oracle may send the data directly to the client contract (step 468). The particular option (or combination of options) implemented or used for communicating or signaling to the client contract that data is available may depend upon the particular implementation of the blockchain being used, the type of data being transmitted, and other factors (e.g., transaction costs, timing desired).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for providing off-blockchain data from multiple independent computing devices to a blockchain using a multi-oracle service, the method comprising:

executing, by the multi-oracle service on a remote computing device, a shared oracle system accessible to a plurality of independent user computing devices not configured to directly operate an oracle or submit data to a blockchain;

generating, by the multi-oracle service, blockchain transactions on behalf of the plurality of user computing devices, each single blockchain transaction being configured to service multiple user computing devices of the plurality of user computing devices simultaneously;

receiving, by the multi-oracle service, at least one first blockchain request from a first user computing device of the plurality of user computing devices, including a plurality of first data source descriptors specified by a first user using the first user computing device, the plurality of first data source descriptors including a first data element, a first data source, and a first update condition;

accessing, by the multi-oracle service, the first data source and gathering the first data element from the first data source;

prompting, by the multi-oracle service, a user using the first user computing device to specify a first update frequency for the first blockchain request, wherein the first update frequency defines how often the first data element from the first data source should be included in a single blockchain transaction;

receiving, by the multi-oracle service, at least one second blockchain request from a second user computing device of the plurality of user computing devices, including a plurality of second data source descriptors specified by a second user using the second user computing device, the plurality of second data source descriptors including a second data element, a second data source, and a second update condition;

accessing, by the multi-oracle service, the second data source and gathering the second data element from the second data source;

prompting, by the multi-oracle service, a user using the second user computing device to specify a second update frequency for the second blockchain request, wherein the second update frequency defines how often the second data element from the second data source should be included in a single blockchain transaction;

adding, by the multi-oracle service, at least one data element gathered from the first data source to a data pool for inclusion in a single blockchain transaction in response to determining that the first update frequency and the first update condition have been satisfied;

adding, by the multi-oracle service, at least one data element gathered from the second data source to the data pool for inclusion in the single blockchain transaction in response to determining that the second update frequency and the second update condition have been satisfied;

selectively generating, by the multi-oracle service, in response to at least one data element gathered from the first data source and second data source being added to the data pool, the single blockchain transaction to fulfill the at least one first and second blockchain requests by conditionally packing together at least one data element of the gathered first data element that is consistent with the first update condition and update frequency and at least one data element of the gathered second data element that is consistent with the second update condition, while excluding any gathered data elements not meeting the respective update conditions and update frequencies; and submitting, by the multi-oracle service, the single blockchain transaction to a blockchain network for inclusion in the blockchain in response to generation of the single blockchain transaction, causing the blockchain network to store, in an immutable ledger, at least the first data element and the second data element in a single transaction record only when the first and second update conditions are satisfied, wherein the inclusion of gathered first and second data elements from the first and second data sources occurs at intervals independent of a frequency of blockchain transaction submissions made by the multi-oracle service to the blockchain; and in response to data being included in the single blockchain transaction satisfying one or more trigger conditions encoded in a plurality of client smart contracts, automatically executing, by the blockchain network, respective ones of the plurality of client smart contracts to perform blockchain-encoded operations based on the off-blockchain data supplied by the multi-oracle service.

2. The method of claim 1, wherein packing the at least one data element in the transaction further includes bit shifting, by the multi-oracle service, at least one of the first data element and the second data element to increase a number of leading zeros in the transaction.

3. The method of claim 1, wherein:

accessing the first data source and gathering the first data element is periodically performed by the multi-oracle service according to the first data update frequency.

4. The method of claim 3, wherein:

accessing the second data source and gathering the second data element is periodically performed by the multi-oracle service according to the second data update frequency.

5. The method of claim 4, further comprising:

estimating, by the multi-oracle service, a first size of the first data element; and calculating, by the multi-oracle service, a first cost based on the first size, the first data update frequency, and a current transaction cost for the blockchain network.

6. The method of claim 5, further comprising:

estimating, by the multi-oracle service, a second size of the second data element; and calculating, by the multi-oracle service, a second cost based on the second size, the second data update frequency, and the current transaction cost for the blockchain network.

7. The method of claim 6, wherein submitting the transaction includes specifying, by the multi-oracle service, a transaction fee based on a percentage of a sum of the first cost and the second cost.

8. The method of claim 1, further comprising determining, by the multi-oracle service, whether the first update condition has been satisfied and whether the second update condition has been satisfied, wherein:

determining whether the first update condition has been satisfied includes at least one of (i) determining, by the multi-oracle service, whether a first predetermined time period has expired, and (ii) determining, by the multi-oracle service, whether the first data element has changed by at least a first predetermined minimum update threshold value; and determining whether the second update condition has been satisfied includes at least one of (i) determining, by the multi-oracle service, whether a second predetermined time period has expired, and (ii) determining, by the multi-oracle service, whether the second data element has changed by at least a second predetermined minimum update threshold value.

9. A non-transitory, computer-readable storage medium storing instructions for a multi-oracle service which are executable by a processor of a computational device, wherein the instructions when executed cause the computational device to perform the method according to claim 1.

10. A system, comprising a computing device including a processor and a non-transitory, computer-readable storage medium storing instructions for a multi-oracle service which are executable by the processor, wherein the instructions, when executed by the processor, cause the multi-oracle service to perform the method according to claim 1.

11. The system of claim 10, wherein the multi-oracle service includes a bit shifter.

12. The method of claim 1, wherein the multi-oracle service receives at least one of the plurality of first data source descriptors and the plurality of second data source descriptors via a web interface.

13. The method of claim 1, wherein the multi-oracle service receives at least one of the plurality of first data source descriptors and the plurality of second data source descriptors via a web application programming interface.

14. The method of claim 1, wherein at least one of the first data source and the second data source includes at least one of a web site and a network accessible web service.

15. The method of claim 1, further comprising, by the multi-oracle service, adding a first entry and a second entry into a job queue, wherein the first entry represents the plurality of first data source descriptors and the second entry represents the plurality of second data source descriptors.

16. The method of claim 1, further comprising:

communicating to the first user, by the multi-oracle service, a first offset within a transaction data field where the first data element is located; and communicating to the second user, by the multi-oracle service, a second offset within the transaction data field where the second data element is located.

17. A multi-oracle service system, comprising a computing device including a processor and a non-transitory, computer-readable storage medium storing a multi-oracle contract including instructions executable by the processor, wherein the instructions, when executed by the processor, cause the computing device to:

execute the multi-oracle contract on a remote computing device as a shared oracle system accessible to a plurality of independent user computing devices not configured to directly operate an oracle or submit data to a blockchain;

generate blockchain transactions on behalf of the plurality of independent user computing devices, each single blockchain transaction being configured to service multiple user computing devices simultaneously;

receive at least one blockchain request from a first user computing device, including a plurality of first data source descriptors specified by a first client contract, the plurality of first data source descriptors including a first data element, a first data source, and a first update condition;

receive at least one blockchain request from a second user computing device, including a plurality of second data source descriptors specified by a second client contract, the plurality of second data source descriptors including a second data element, a second data source, and a second update condition;

access the first data source and gather the first data element from the first data source;

access the second data source and gather the second data element from the second data source;

adding at least one data element gathered from the first data source to a data pool for inclusion in a single blockchain transaction in response to determining that the first update frequency and the first update condition have been satisfied;

adding at least one data element gathered from the second data source to the data pool for inclusion in the single blockchain transaction in response to determining that the second update frequency and the second update condition have been satisfied;

selectively generate the single blockchain transaction to fulfill the blockchain requests from both the first and second user computing devices by conditionally packaging together at least one gathered data element of the gathered first data element that is consistent with the first update condition and at least one data element of the gathered second data element that is consistent with the second update condition, while excluding any gathered data elements not meeting the respective update conditions;

submit the single blockchain transaction to a blockchain network for inclusion in a blockchain, causing the blockchain network to store, in an immutable ledger, at least the first data element and the second data element in a single transaction record only when the first and second update conditions are satisfied, wherein the inclusion of the gathered first and second data elements from the first and second data sources respectively occurs at intervals independent of a frequency of blockchain transaction submissions made by the multi-oracle contract to the blockchain;

in response to data being included in the single blockchain transaction satisfying one or more trigger conditions encoded in a plurality of client smart contracts, automatically executing, by the blockchain network, respective ones of the plurality of client smart contracts to perform blockchain-encoded operations based on the off-blockchain data supplied by the multi-oracle service; and communicate, by the multi-oracle contract, with at least one client contract of the first client contract and the second client contract regarding the associated data element that was gathered and included in the transaction via at least one of:

forwarding the associated data element to the at least one client contract via the multi-oracle contract;

signaling the at least one client contract that the associated data element is available on the blockchain via the multi-oracle contract; and sending the associated data element to the at least one client contract without utilizing the multi-oracle contract;

wherein the first data element is (i) packaged in the transaction when the first update condition has been satisfied and (ii) excluded from the transaction when the first update condition has not been satisfied; and wherein the second data element is (i) packaged in the transaction when the second update condition has been satisfied and (ii) excluded from the transaction when the second update condition has not been satisfied.

18. The system of claim 17, wherein, when the first data element is packaged in the transaction, the computing device communicates with the first client contract via at least one of:

forwarding the first data element to the first client contract via the multi-oracle contract;

signaling the first client contract that the first data element is available on the blockchain via the multi-oracle contract; and sending the first data element to the first client contract without utilizing the multi-oracle contract.

19. The system of claim 18, wherein, when the second data element is packaged in the transaction, the computing device communicates with the second client contract via at least one of:

forwarding the second data element to the second client contract via the multi-oracle contract;

signaling the second client contract that the second data element is available on the blockchain via the multi-oracle contract; and sending the second data element to the second client contract without utilizing the multi-oracle contract.

* * * * *